United States Patent
Koba et al.

(10) Patent No.: US 7,054,895 B2
(45) Date of Patent: May 30, 2006

(54) SYSTEM AND METHOD FOR PARALLEL COMPUTING MULTIPLE PACKED-SUM ABSOLUTE DIFFERENCES (PSAD) IN RESPONSE TO A SINGLE INSTRUCTION

(75) Inventors: Igor M Koba, Savannah, GA (US); Mikhail Chernomordik, Savannah, GA (US)

(73) Assignee: Ligos Corporation, Savannah, GA (US)

( * ) Notice: Subject to any disclaimer, the term of this patent is extended or adjusted under 35 U.S.C. 154(b) by 765 days.

(21) Appl. No.: 10/175,218

(22) Filed: Jun. 19, 2002

(65) Prior Publication Data
US 2003/0005267 A1    Jan. 2, 2003

Related U.S. Application Data

(66) Substitute for application No. 60/299,881, filed on Jun. 21, 2001.

(51) Int. Cl.
*G06F 15/00* (2006.01)

(52) U.S. Cl. ..................... 708/201
(58) Field of Classification Search ............ 708/201
See application file for complete search history.

(56) References Cited

U.S. PATENT DOCUMENTS

| | | | | |
|---|---|---|---|---|
| 5,586,202 A | * | 12/1996 | Ohki et al. ............ | 382/236 |
| 5,610,850 A | * | 3/1997 | Uratani et al. ............ | 708/671 |
| 6,243,803 B1 | * | 6/2001 | Abdallah et al. ............ | 712/210 |
| 6,269,174 B1 | | 7/2001 | Koba et al. | |
| 6,377,970 B1 | * | 4/2002 | Abdallah et al. ............ | 708/603 |
| 6,526,430 B1 | * | 2/2003 | Hung et al. ............ | 708/523 |

* cited by examiner

*Primary Examiner*—Chuong D. Ngo
(74) *Attorney, Agent, or Firm*—Thomas, Kayden, Horstemeyer & Risley

(57) ABSTRACT

A system and method are presented in which multiple packed-sum absolute differences (PSAD) are computed in response to a single instruction. One embodiment of the system comprises a first register configured to store a first operand having data elements, and a second register configured to store a second operand having data elements. Additionally, the system comprises a processor configured to perform multiple PSAD calculations between the data elements of the second operand and a first subset of data elements of the first operand. The multiple PSAD calculations are performed in response to a single instruction set. One embodiment of the method comprises the steps of receiving a single instruction, and performing multiple PSAD calculations in response to the single instruction.

45 Claims, 10 Drawing Sheets

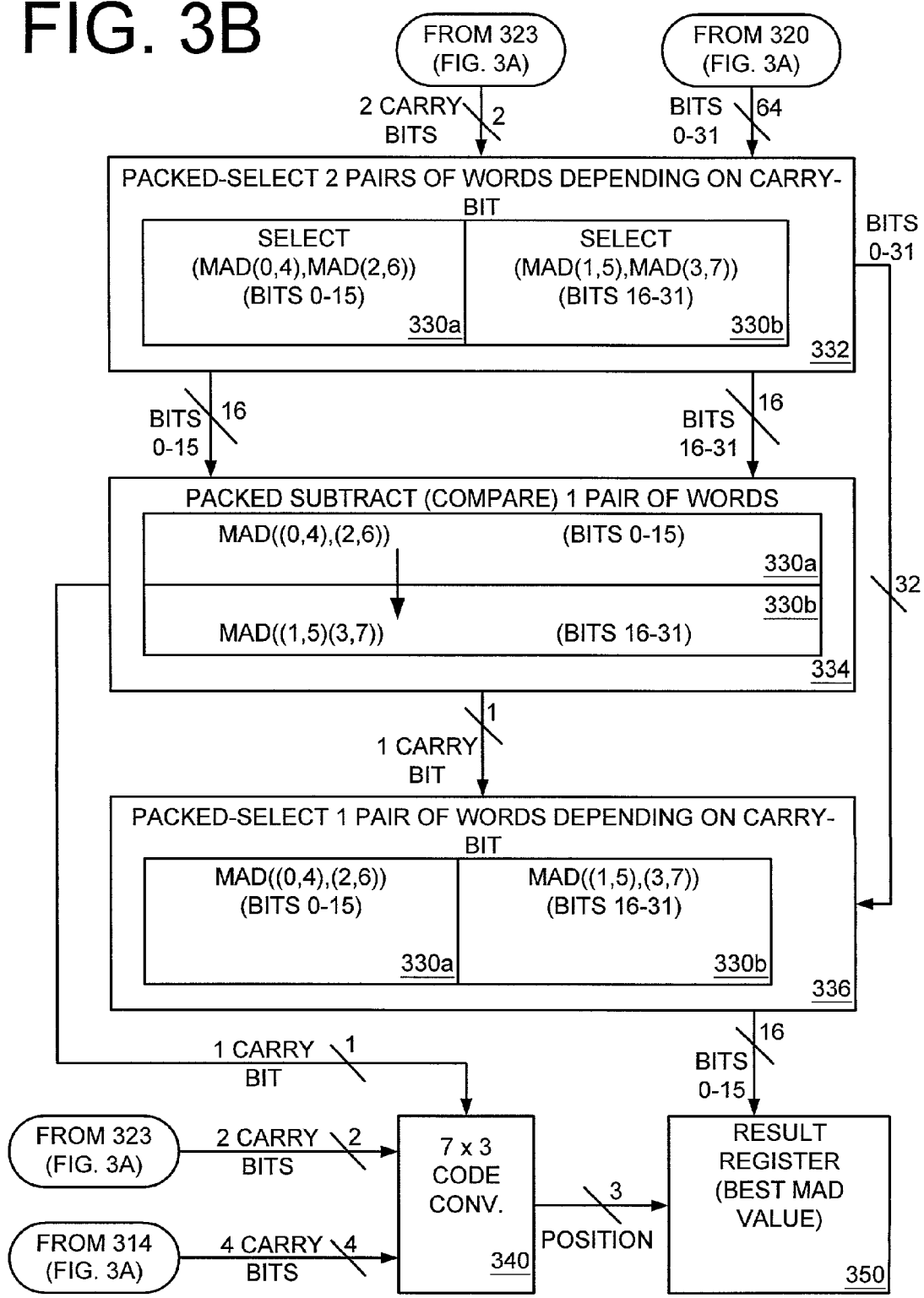

SYSTEM AND METHOD FOR PARALLEL COMPUTING MULTIPLE PACKED-SUM ABSOLUTE DIFFERENCES (PSAD) IN RESPONSE TO A SINGLE INSTRUCTION

CROSS REFERENCE TO RELATED APPLICATIONS

This application claims the benefit of U.S. provisional patent application ser. No. 60/299,881, filed Jun. 21, 2001, which is incorporated herein by reference in its entirety.

FIELD OF INVENTION

The present invention relates generally to the field of microprocessors and instructions, and, more particularly, to a system and method for parallel computing multiple packed-sum absolute differences (PSAD) in response to a single instruction.

BACKGROUND

Computing a sum of absolute differences of pixels is used in many applications including motion video encoding algorithms and methods such as MPEG video encoding. This computation often comprises the more difficult computational part of video encoding algorithms. Sum of absolute differences of pixels is used to compare a measure of similarity of pixel blocks on a pair of pictures that is a part of motion estimation which, in turn, is a part of many video encoding algorithms. Computing the sum of absolute differences of pixels for video encoding, therefore, involves enormous amounts of calculations.

One existing method to increase the microprocessor throughput for computing the sum of absolute differences of pixels involves providing a special microprocessor instruction for computing packed-sum absolute differences (PSAD). Many modern microprocessors, such as the Intel Pentium™ III and Pentium™ 4, Sun Microsystems UltraSparc™, Compaq Alpha™, and others, while possibly using different instruction mnemonic names, provide such microprocessor instructions to compute the PSAD value.

The PSAD value is the sum of differences of absolute values for a plurality of neighborhood pixels (typically for 8 neighborhood pixels). Thus, the PSAD value is used to compute mean absolute difference of pixels (MAD), which is used as a criterion for picture similarity in motion-estimation algorithms. For example, computing one MAD value for a 16 pixel by 16 pixel block size requires a microprocessor to execute 32 PSAD instructions and add the results of all the executed PSAD instructions. Given the enormous amounts of calculations typically involved in, for example, motion estimation, the task of high quality real-time video encoding occupies much of the computational capabilities of modern microprocessors.

There are many algorithms proposed to reduce computational complexity of motion estimation. But these fast motion-estimation algorithms often result in reduced picture quality for given bit-rates and given conditions, since motion estimation is both execution intensive and memory-loading intensive. The picture data (i.e., pixel data) for computing PSAD criteria are loaded from a large array containing a reference image and a compared (or object) image with the pixels of a new pixel block.

Specialized semiconductor chips for motion estimation and video encoding utilize highly optimized architectures with pipelined systolic arrays of execution elements to perform motion estimation. But that solution appears to be too costly for general-purpose microprocessors. The developers of modern microprocessors, therefore, seek performance improvement for multimedia applications utilizing parallel multimedia data types and instructions. These instructions operate on multiple small-data elements, at any given time, in one instruction. Such instructions, in the case of Intel™ microprocessors, are called MMX or SIMD instructions. While the MMX and SIMD instructions give sufficient improvement in performance for certain multimedia applications, they still typically do not provide enough performance improvement for complex motion estimation tasks. The Intel™ microprocessors for example compute PSAD values in response to a PSADBW instruction, which operates on 64-bit operands or 128-bit operands. While PSADBW improves performance of certain motion estimation computation, further improvements are needed for high-quality real-time video encoding.

PSADBW instructions compute the absolute value of the difference of eight unsigned byte integers from a source operand (first operand) and from a destination operand (second operand). These eight differences are then summed to produce an unsigned word-integer result that is stored in the destination operand. Thus, while the PSADBW instruction helps to reduce computation time, it is still limited since: (1) the instruction has long latency that delays execution of the next instruction; (2) there are small amounts of execution units in the processors to perform the instruction, which limits the amount of instructions that can be issued simultaneously, and, hence, issuing more than two independent PSADBW instructions does not give any speed improvement; (3) the instructions require multiple loads of data from memory to compute MAD values for pixel blocks, which makes it difficult to interleave loads, and leaves very little spare time for prefetch; and (4) motion estimation often requires MAD calculations for many pixel blocks at different addresses, thereby resulting in multiple instruction loads by pointers that are not aligned, thereby slowing the memory loading operations.

The PSADBW instruction, and similar instructions of other microprocessors that compute PSAD values, improves the performance of motion estimation computations. However, as stated above, high-quality real-time video encoding may require greater efficiency than that provided by PSADBW and similar instructions. Increasing the number of execution units performing PSADBW instructions in a microprocessor may gain some improvements. However, the issuing of multiple PSADBW instructions would still be limited by the loading of operands from memory, usually from pointers that are not aligned, and, also, by data dependency of the results of the instruction that are added in one or two registers that accumulate the total result. Loading operands from memory becomes a limiting factor in performance of computing PASD values since the clock speed and amount of execution units in the microprocessor increases.

Given these limitations, a heretofore-unaddressed need exists in the industry.

SUMMARY

The present invention provides a system and method for computing multiple packed-sum absolute differences (PSAD) in response to a single instruction.

Briefly described, in architecture, one embodiment of the system comprises a first register configured to store a first operand having data elements, and a second register configured to store a second operand having data elements.

Additionally, the system comprises a processor configured to perform multiple PSAD calculations between the data elements of the second operand and a first subset of data elements of the first operand. The multiple PSAD calculations are performed in response to a single instruction set.

The present invention can also be viewed as providing methods for computing multiple PSAD in response to a single instruction. In this regard, one embodiment of such a method comprises the steps of receiving a single instruction, and performing multiple PSAD calculations in response to a single instruction.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 3A and 3B are block diagrams showing one embodiment of a system configured to perform a binary search of a plurality of MAD values to determine a "best" MAD value.

DETAILED DESCRIPTION OF THE PREFERRED EMBODIMENTS

Figure 1A:
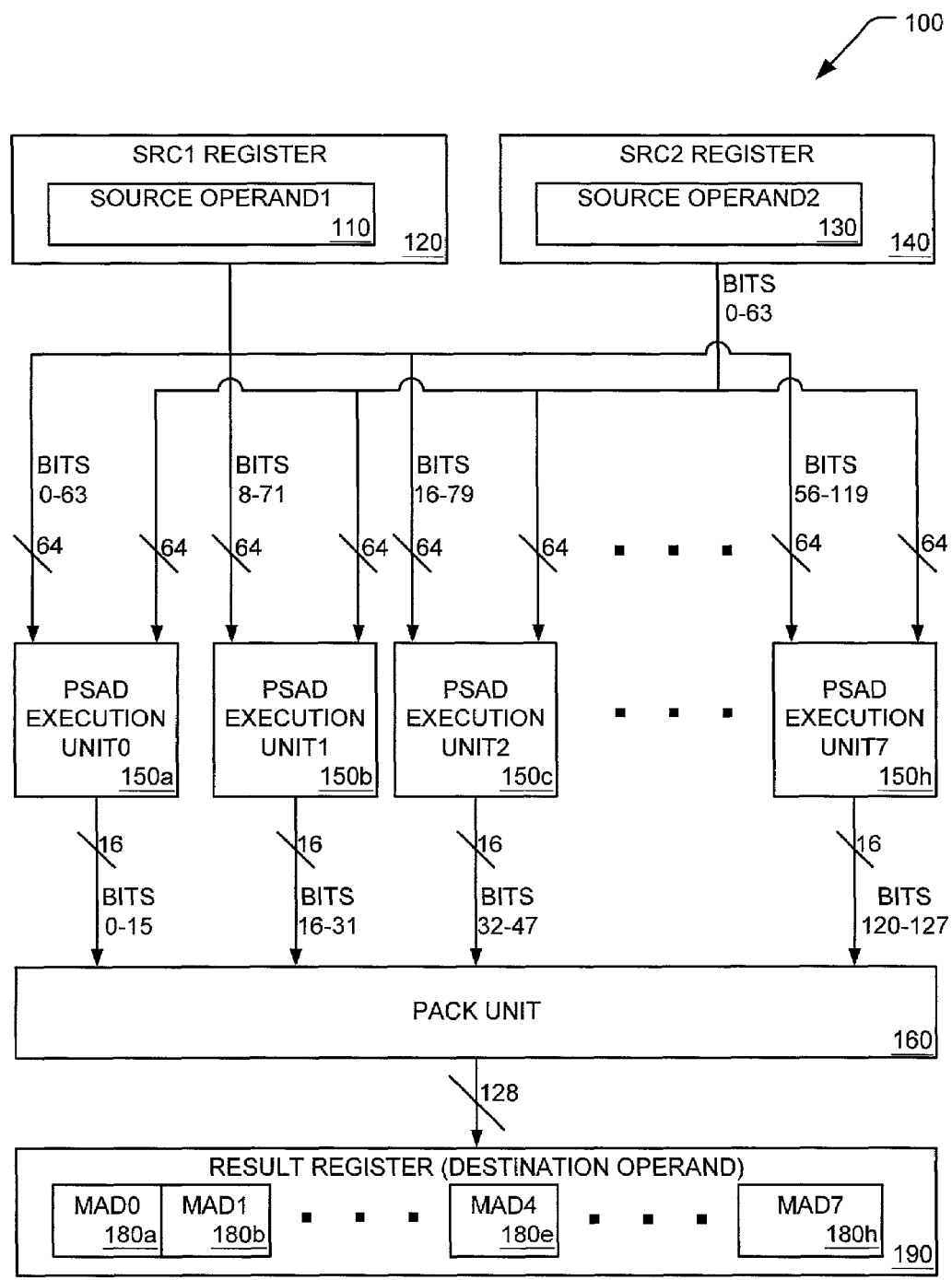
FIG. 1A is a block diagram showing one embodiment of a system configured to perform multiple packed-sum absolute differences (PSAD) calculations in response to a single microprocessor instruction.

Having summarized various aspects of the present invention, reference is now made in detail to the description of the embodiments as illustrated in the drawings. While the several embodiments are described in connection with these drawings, there is no intent to limit the invention to the embodiment or embodiments disclosed herein. On the contrary, the intent is to cover all alternatives, modifications, and equivalents included within the spirit and scope of the invention as defined by the appended claims.

FIG. 1A is a block diagram showing one embodiment of a system configured to perform multiple packed-sum absolute differences (PSAD) calculations in response to a single microprocessor instruction. As shown in FIG. 1A, one embodiment of the system comprises a first register 120 (hereinafter also referred to as SRC1) having a first operand 110 (hereinafter also referred to as OP1), and a second register 140 (hereinafter also referred to as SRC2) having a second operand 130 (hereinafter also referred to as OP2). In a preferred embodiment, the system is configured to take advantage of the fact that many motion estimation algorithms calculate mean absolute differences (MAD) for neighboring pixels. Thus, data elements in OP1 110 may represent contiguous pixels in an object image, while data elements in OP2 130 may represent contiguous pixels in a reference image. Alternatively, data elements in OP1 110 and OP2 130 may represent contiguous pixels in video frames. In any event, OP1 110 and OP2 130 comprise multiple data elements representing contiguous pixels, and, hence, reduce the number of data loading operations as a function of the size of the operands 110, 130. Thus, for example, if OP1 110 is a 120-bit operand OP2 130 is a 64-bit operand, then, as shown below, up to eight PSAD calculations may be performed without further loading of data.

Since the calculation of MAD values includes the calculation of multiple PSAD values, a processor 100, as shown in FIG. 1A, also includes a plurality of PSAD execution units 150a ... 150h (hereinafter also referred to as PSAD unit n 150). In this sense, the PSAD unit0 150a receives the first 64 bits of OP1 110 (i.e., OP1[0:63]) from SRC1 120 and the 64-bit OP2 130 (i.e., OP2[0:63]) from SRC2 140, and performs a PSAD calculation between OP1[0:63] and OP2 [0:63]. The PSAD unit1 150b receives OP1[8:71], which represent the next contiguous eight bytes of OP1 110, and OP2[0:63], and performs a PSAD calculation between OP1 [8:71] and OP2[0:63]. Similarly, each subsequent PSAD execution unit 150 receives subsequent contiguous eight bytes of OP1 110 and the eight bytes of OP2 130, and performs a PSAD calculation between the received bytes of OP1 110 and OP2 130. Thus, when each of the eight PSAD execution units 150 is finished with its calculation, each of the PSAD execution units 150 has produced a 16-bit result indicative of the PSAD calculation, and, further, of a mean absolute difference (MAD) value.

Each of the results from the PSAD executions units 150 is directed to a pack unit 160, which concatenates the eight 16-bit results into a single 128-bit destination operand 180 (i.e., DOP[0:127]), which is stored in a result register 190. The 128-bit DOP 180, as a whole, represents the eight calculated mean absolute difference (MAD) values 180a ... 180h from the eight PSAD execution units 150.

Thus, for a 120-bit OP1 110 and a 64-bit OP2 130, there would be eight parallel processes, summarized as follows:

PSAD0 performs BYTE_SUM(ABS(SRC1[0:63]-SRC2 [0:63])) and stores the result in DOP[0:15];

PSAD1 performs BYTE_SUM(ABS(SRC1[8:71]-SRC2 [0:63])) and stores the result in DOP[16:31];

PSAD2 performs BYTE_SUM(ABS(SRC1[16:79]-SRC2[0:63])) and stores the result in DOP[32:47];

PSAD3 performs BYTE_SUM(ABS(SRC1[24:87]-SRC2[0:63])) and stores the result in DOP[48:63];
PSAD4 performs BYTE_SUM(ABS(SRC1[32:95]-SRC2[0:63])) and stores the result in DOP[64:79];
PSAD5 performs BYTE_SUM(ABS(SRC1[40:103]-SRC2[0:63])) and stores the result in DOP[80:95];
PSAD6 performs BYTE_SUM(ABS(SRC1[48:111]-SRC2[0:63])) and stores the result in DOP[96:111];
PSAD7 performs BYTE_SUM(ABS(SRC1[56:119]-SRC2[0:63])) and stores the result in DOP[112:127];
wherein the BYTE_SUM operation is a sum of each contiguous 8-bit segment of: ABS(SRC1[]-SRC2[]), for example:

$$DOP[0:15] = (ABS(SRC1[0:7] - SRC2[0:7]) +$$
$$(ABS(SRC1[8:7] - SRC2[8:15]) +$$
$$(ABS(SRC1[16:23] - SRC2[16:23]) +$$
$$(ABS(SRC1[24:31] - SRC2[24:31]) +$$
$$(ABS(SRC1[32:39] - SRC2[32:39]) +$$
$$(ABS(SRC1[40:47] - SRC2[40:47]) +$$
$$(ABS(SRC1[48:55] - SRC2[48:55]) +$$
$$(ABS(SRC1[56:63] - SRC2[56:63]))$$

Thus, as shown in the embodiment of FIG. 1A, a 120-bit OP1 110, a 64-bit OP2 130, and eight PSAD execution units 150 allows the processor 100 to perform eight PSAD calculations without additional loading of data. Additionally, the configuration of FIG. 1A permits the calculation of eight PSAD values in parallel in response to a single instruction, thereby eliminating additional latency.

While the specific embodiment of FIG. 1A shows eight parallel PSAD execution units 150, it will be clear to one of ordinary skill in the art that different embodiments may include a greater or a fewer number of PSAD execution units 150. It is, however, worthwhile to note that, preferably, the number of PSAD execution units be a power of 2 (e.g., 2, 4, 8, 16, . . . , $2^n$) for simplicity of implementation. In this sense, the SRC1 120 would concomitantly be a $2^{n-1}$-bit register, and OP1 110 would preferably be a $2^{n-1}$-bit operand. Additionally, while FIG. 1A shows the processing of contiguous bits, the processor 100 in more complex environments may be configured to process subsets of OP1 110 that are non-contiguous.

Figure 1B:
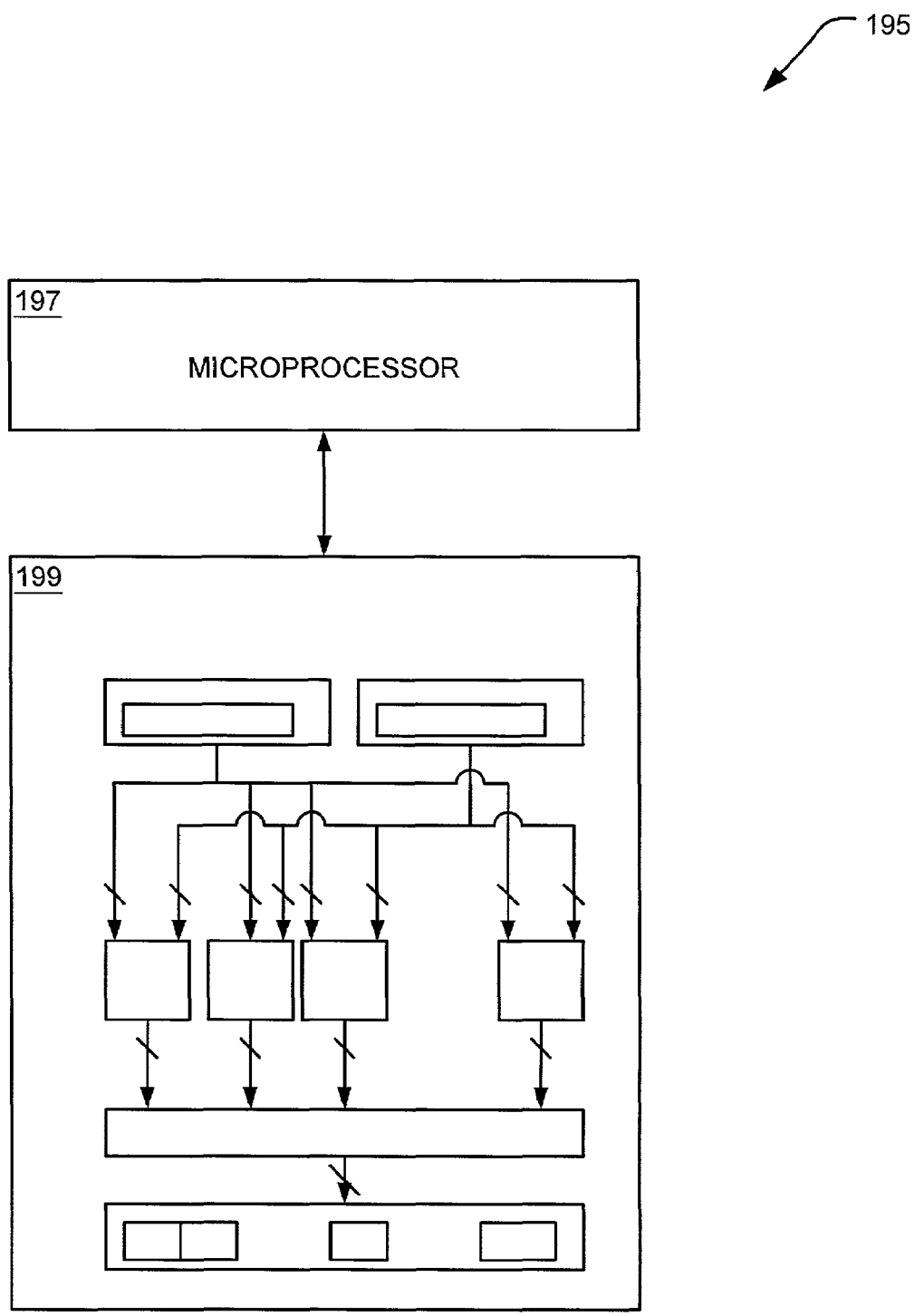
FIG. 1B is a block diagram showing another embodiment of a system having dedicated hardware configured to perform multiple PSAD calculations in response to an instruction from a microprocessor.

FIG. 1B is a block diagram showing another embodiment 195 of a system having dedicated hardware 199 configured to perform multiple PSAD calculations in response to an instruction from a microprocessor 195. The dedicated hardware 199 may be configured similar to the system of FIG. 1A. Thus, while FIG. 1A shows one embodiment of the invention as being a part of the processor 100, it will be clear to one of ordinary skill in the art that the system of FIG. 1A may be implemented in dedicated hardware 199 that is physically separate from the microprocessor 195. Thus, the system of FIG. 1A may be configured in such a way that the microprocessor 195 accesses the dedicated hardware 199 in response to the execution of the single instruction. This permits the microprocessor 195 to perform other calculations while the dedicated hardware 199 performs the multiple PSAD calculations.

Figure 2A:
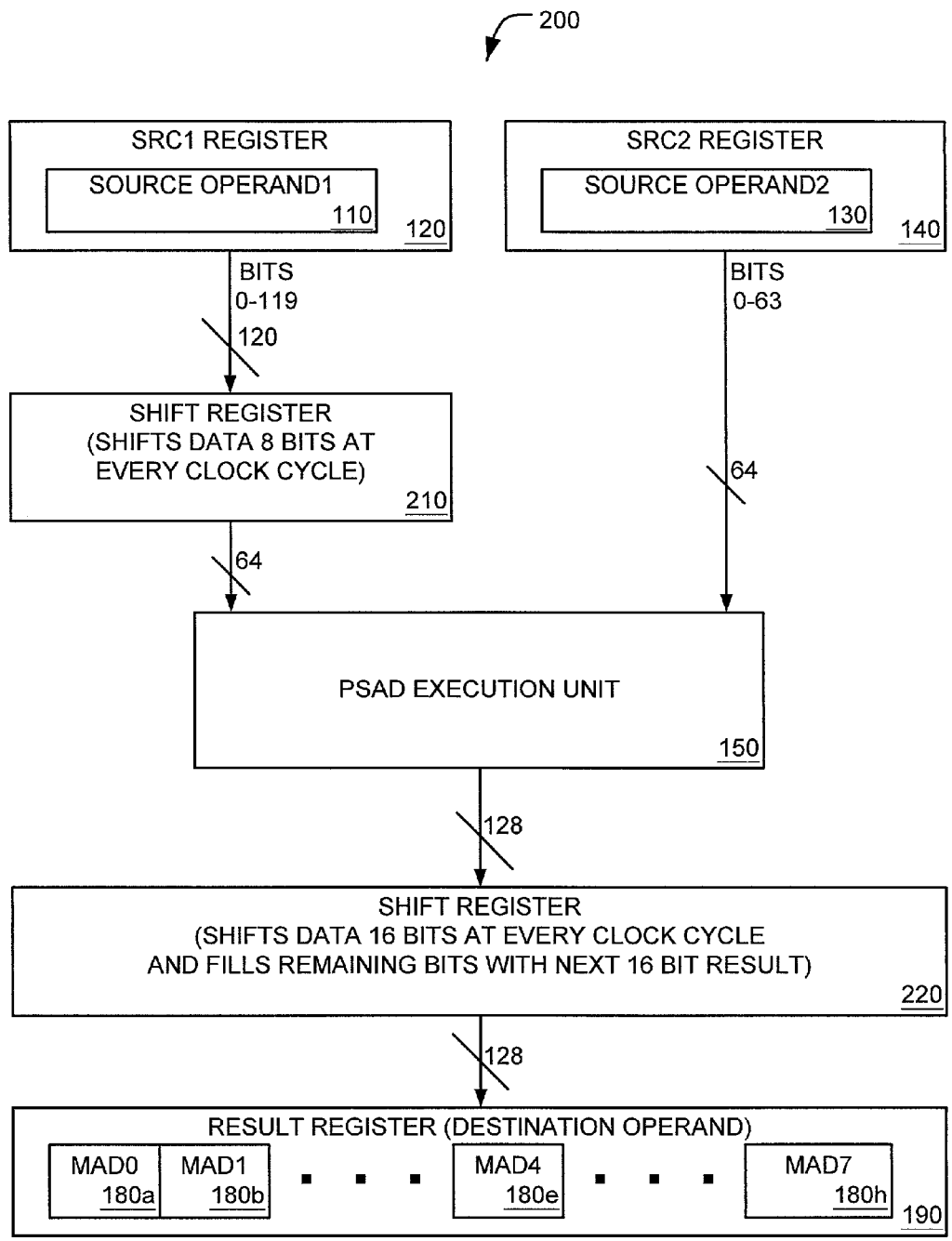
FIG. 2A is a block diagram showing another embodiment of a system configured to perform multiple PSAD calculations in response to a single microprocessor instruction.

FIG. 2A is a block diagram showing another embodiment of a processor 200 configured to perform multiple PSAD calculations in response to a single microprocessor instruction. Unlike the embodiment of FIG. 1A, only a single PSAD execution unit 150 is employed in the embodiment of FIG. 2A. However, an additional 8-bit shift register 210 is employed to direct the appropriate bits of OP1 110 to the PSAD execution unit. Thus, as shown in FIG. 2A, given OP1[0:119] and OP2[0:63], the PSAD execution unit 150 would effectively perform the function of PSAD unit0 150a (FIG. 1A) at a first clock cycle. Subsequently, at a second clock cycle, the PSAD execution unit 150 would perform the function of PSAD unit1 150b (FIG. 1A), etc. In other words, the shift register 210 would, effectively, direct appropriate bits of OP1 110 to the PSAD execution unit 150, such that:

PSAD execution unit performs BYTE_SUM(ABS(SRC1[0:63]-SRC2[0:63])) at clock cycle 1;
PSAD execution unit performs BYTE_SUM(ABS(SRC1[8:71]-SRC2[0:63])) at clock cycle 2;
PSAD execution unit performs BYTE_SUM(ABS(SRC1[16:79]-SRC2[0:63])) at clock cycle 3;
PSAD execution unit performs BYTE_SUM(ABS(SRC1[24:87]-SRC2[0:63])) at clock cycle 4;
PSAD execution unit performs BYTE_SUM(ABS(SRC1[32:95]-SRC2[0:63])) at clock cycle 5;
PSAD execution unit performs BYTE_SUM(ABS(SRC1[40:103]-SRC2[0:63])) at clock cycle 6;
PSAD execution unit performs BYTE_SUM(ABS(SRC1[48:111]-SRC2[0:63])) at clock cycle 7; and
PSAD execution unit performs BYTE_SUM(ABS(SRC1[56:119]-SRC2[0:63])) at clock cycle 8.

The processor 200 further comprises an additional shift register 220, which is configured to shift the 16-bit PSAD result from each clock cycle, thereby effectively generating contiguous 16-bit segments of PSAD results, which are stored in a result register 190 as DOP[0:127]. Thus, each contiguous 16-bit segment of DOP[0:127] would represent a MAD value calculated by the PSAD execution unit 150 at each clock cycle.

Unlike the embodiment of FIG. 1A, in which the eight PSAD calculations are performed in parallel, the processor 200 here performs the eight PSAD calculations sequentially. However, the processing is still vastly simplified since the data-loading operation is only performed once (i.e., SRC1 120 and SRC2 140 are only loaded once with their respective data elements). Additionally, latency is reduced since data shifting operations by the shift register 210 (or shift register 220) may concurrently be performed for subsequent (or preceding) subsets of data elements while the PSAD execution unit 150 is performing a given PSAD calculation. Furthermore, the processor 200 of FIG. 2A provides for a more simplified hardware architecture.

While the specific embodiment of FIG. 2A shows eight sequential PSAD calculations, it will be clear to one of ordinary skill in the art that different embodiments may include a greater or a fewer number of PSAD calculations. It is, however, worthwhile to note that, preferably, the number of PSAD execution units be a power of 2 (e.g., 2, 4, 8, 5 16, . . . , $2^n$) for simplicity of implementation. In this sense, the SRC1 120 would concomitantly be a $2^{n-1}$-bit register, and OP1 110 would preferably be a $2^{n-1}$-bit operand. Additionally, while FIG. 1A shows the processing of contiguous bits, the processor 100, in more complex environments, may be configured to process subsets of OP1 110 that are non-contiguous.

Regardless of whether the embodiment of FIG. 1A or the embodiment of FIG. 2A is employed to derive the DOP 180, the same calculation is usually repeated for all pixel lines in the macroblock, typically comprising 8 or 16 consecutive lines. The results of the multiple PSAD calculations for every line are added together. A single 128-bit accumulator register may be utilized. The results of each multiple PSAD calculation can be added to the accumulator register using a "packed add" instruction, which is typically supported by modern microprocessors. In some embodiments the "packed add" operation may be included into the flow of the multiple PSAD operations to avoid a calling of separate instructions (i.e., the multiple PSAD results would be automatically added to the values previously accumulated in the accumulator register).

Note that the next multiple PSAD operation can begin execution before the previous multiple PSAD operation is completed because there is no explicit data dependency. This is beneficial for performance since many modern microprocessors are capable of executing multiple instructions in sequence if one instruction is not explicitly data dependent on the previous one. Given the increased efficiency, another embodiment of the invention may be perceived as a microprocessor instruction that is capable of recursively performing the multiple PSAD instructions in response to a single instruction. For simplicity, this single microprocessor instruction may be designated as a multiple-multiple-PSAD (MMPSAD) instruction. Since the MMPSAD instruction permits recursive calculations of multiple PSAD values, parameters of the MMPSAD instruction may include an initial address, which provides the memory location of the first pixel line, and an iteration number, which designates the number of consecutive pixel lines for which multiple PSAD values are calculated (i.e., the number of iterations). In a preferred embodiment, the number of iterations would be any power of 2 (e.g., 2, 4, 8, 16, etc.). Thus, for example, if the MMPSAD instruction includes a starting address of 0×00 and indicates eight iterations, then the system would calculate eight consecutive multiple PSAD values from 0×00.

Figure 3A:
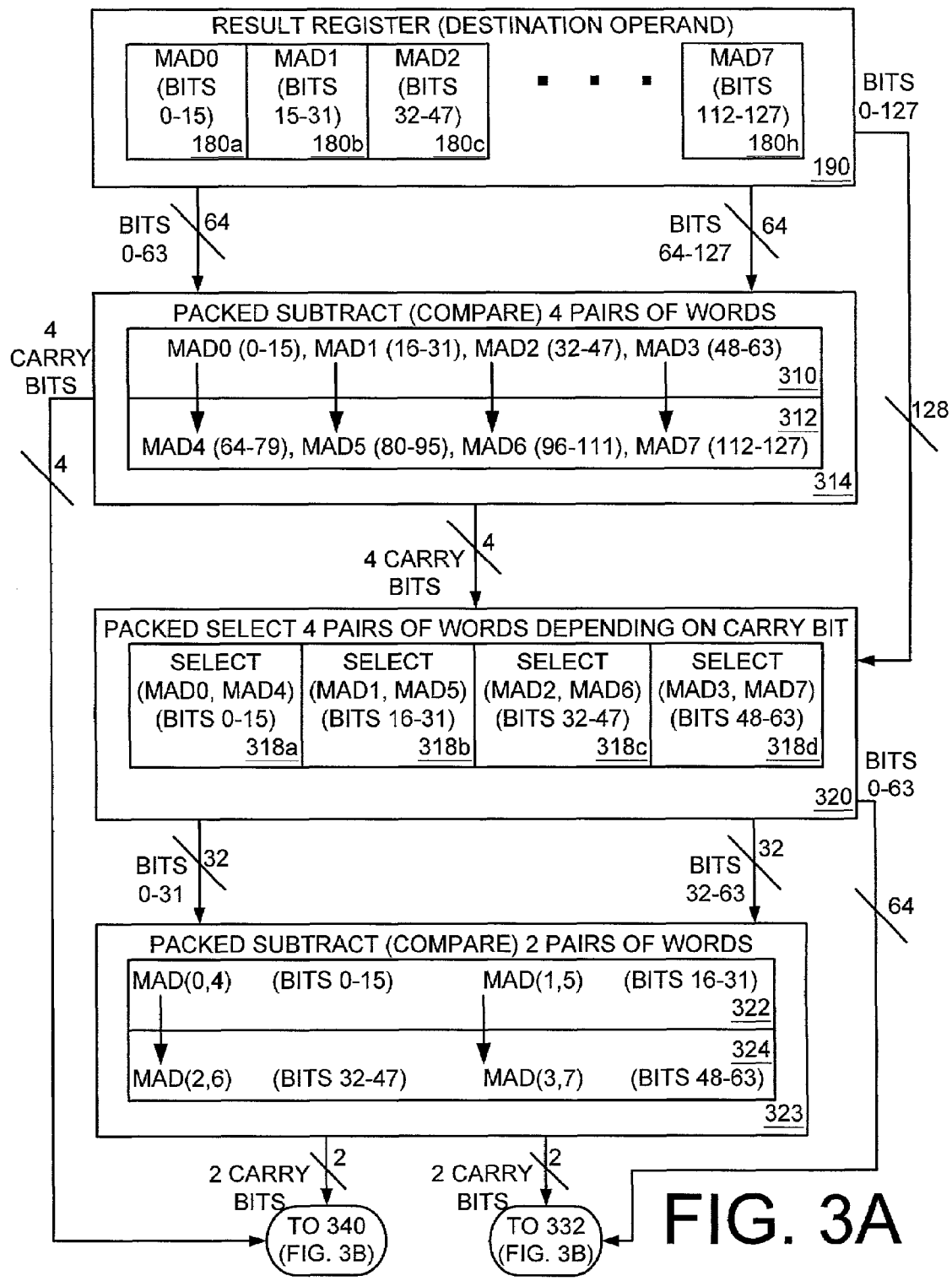

In any event, regardless of whether the embodiment of FIG. 1A or the embodiment of FIG. 2A or other alternative embodiments are employed to derive the DOP 180, once all of the MAD values for a number of consecutive lines in the macroblock are calculated and added to the corresponding values in an accumulation register, motion estimation algorithms often derive a single "best" MAD value by determining a minimum MAD value from the plurality of calculated MAD values. One embodiment of a system for determining a "best" MAD value is shown in FIGS. 3A and 3B. Since the embodiments of FIGS. 1A and 2A produce a 128-bit DOP (i.e., eight MAD values), the specific embodiment of FIGS. 3A and 3B show the derivation of the "best" MAD value from the 128-bit DOP. However, it will be clear to one of ordinary skill in the art that, if the processors 100, 200 of FIGS. 1A and 2A are configured to produce a different $2^n$ number of MAD values, the embodiment of FIGS. 3A and 3B may be appropriately altered to accommodate the $2^n$ MAD values.

Figure 2B:
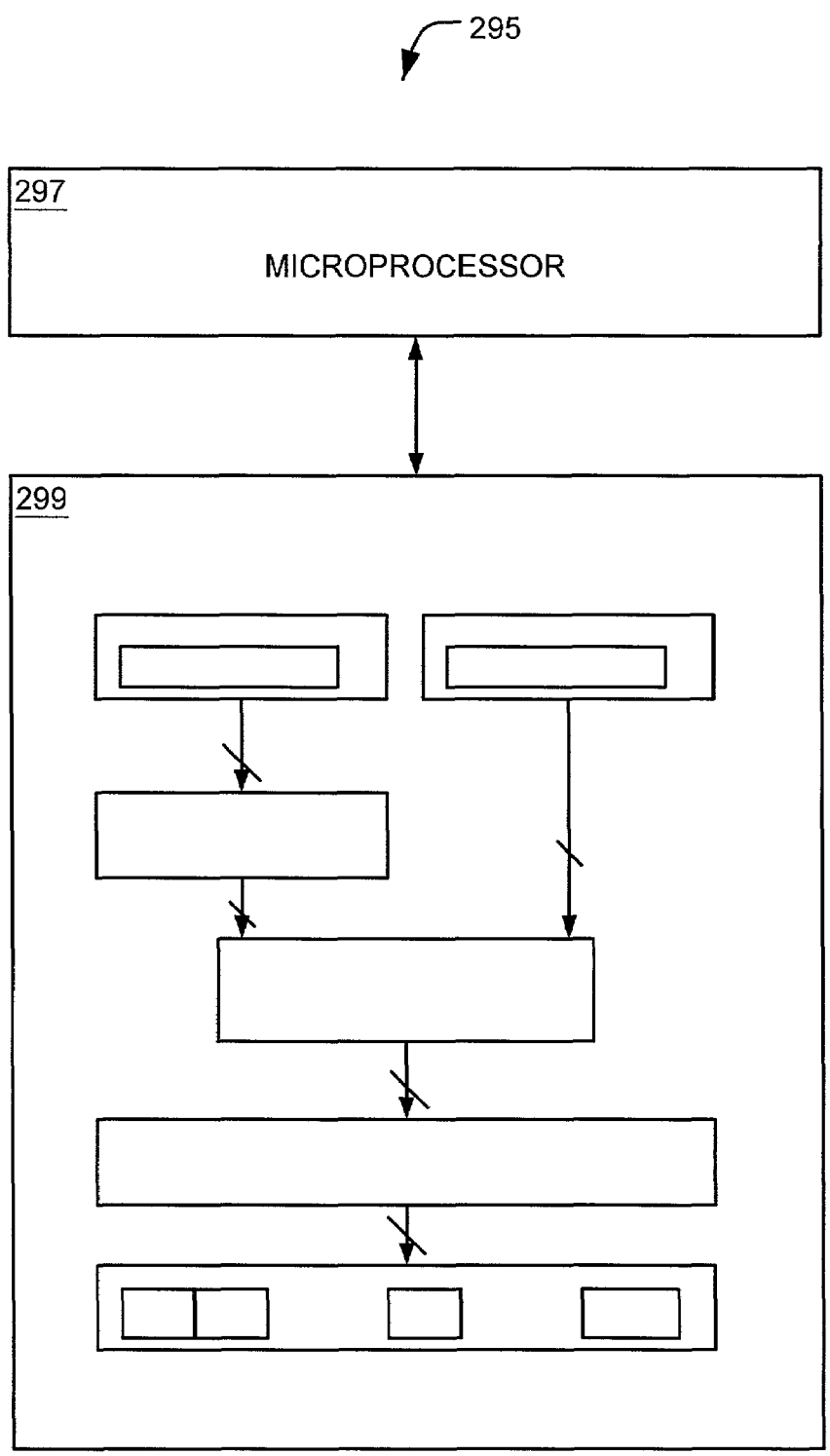
FIG. 2B is a block diagram showing another embodiment of a system having dedicated hardware configured to perform multiple PSAD calculations in response to an instruction from a microprocessor.

While FIG. 2A shows one embodiment of the invention as being a part of the processor, it will be clear to one of ordinary skill in the art that the system of FIGS. 2A may be implemented in dedicated hardware that is physically separate from a microprocessor. This is shown in FIG. 2B, which shows the system of FIG. 2A such that a microprocessor 297 accesses the dedicated hardware 299 in response to the execution of the single instruction. This permits the microprocessor to perform other calculations while the dedicated hardware performs the MMPSAD calculation. As shown in FIG. 2B, the dedicated hardware 299 may be configured similar to the processor of FIG. 2A.

FIGS. 3A and 3B are block diagrams showing one embodiment of a system configured to perform a binary search of a plurality of calculated MAD values to determine the lowest MAD value. In a broad sense, the system of FIGS. 3A and 3B performs a binary search on non-overlapping 16-bit segments of the 128-bit DOP in order to determine which of the 16-bit segments has the minimum value as compared to the other 16-bit segments. In other words, since each non-overlapping 16-bit segment represents a MAD value, the system performs a binary search on the $2^n$ MAD values to determine which of the $2^n$ MAD values is the "best" MAD value.

The embodiment shown in FIGS. 3A and 3B takes advantage of the fact that the MAD comparing procedure is mathematically equivalent to first selecting the lowest of eight separate MAD values and finding a position (e.g., an integer number from 0 to 7) of the lowest MAD value, then comparing only one of the lowest MAD values with the "best" previously-achieved MAD value. Also, if the one MAD value is smaller than the previously-achieved MAD value, then storing the new lowest MAD value and pixel block position. For this, only one conditional instruction is required, which compares one new MAD value with the "best" previously-achieved MAD value. It is, however, possible to select the lowest of eight separate MAD values (packed in a words format in one register) and find the position (e.g., integer number from 0 to 7) of the lowest MAD value, without conditional instructions, using parallel SIMD instructions that are supported by many microprocessors. The disadvantage of such an approach is that multiple instructions are executed. In any event, it is worthwhile to note that greater performance can be achieved by executing special microprocessor instructions that are specifically designed for selecting the lowest MAD value and finding its position.

In the embodiment of FIGS. 3A and 3B, which show the calculation of the "best" MAD value using a single conditional instruction, DOP[0:127] is divided into two 64-bit segments 310, 312. The first 64-bit segment 310 being DOP[0:63], which represents MAD0, MAD1, MAD2, and MAD3, and the second 64-bit segment 312 being DOP[64:127], which represents MAD4, MAD5, MAD6, and MAD7. The two 64-bit segments, DOP[0:63] 310 and DOP[64:127] 312, are directed to a four-word packed-subtract unit 314, while DOP[0:127] 180 is directed to a four-pair packed-select unit 320. The four-word packed-subtract unit 314 compares DOP[0:63] with DOP[64:127], which essentially results in four comparisons of 16-bit word-pairs as follows:

comparison of MAD0 with MAD4 to determine the position of the lower MAD value, MAD(0,4);

comparison of MAD1 with MAD5 to determine the position of the lower MAD value, MAD(1,5);

comparison of MAD2 with MAD6 to determine the position of the lower MAD value, MAD(2,6); and comparison of MAD3 with MAD7 to determine the position of the lower MAD value, MAD(3,7).

The four-word packed-subtract unit 314 produces four carry bits (i.e., a four-bit result indicative of the position of the lower four MAD values). The four carry bits are propagated to the four-pair packed-select unit 320, which has the 128-bit DOP 180, and, also, to a 7×3 code converter 340. The four-pair packed-select unit 320 selects the four 16-bit results that correspond to the lower four MAD values as indicated by the four carry bits. These four 16-bit results are directed to a two-pair packed-select unit 332. Additionally, these four 16-bit results are divided into two 32-bit segments 322, 324, which are directed to a two-word packed-subtract unit 323, which compares the two 32-bit segments 322, 324, and which essentially results in two comparisons of 16-bit word-pairs as follows:

comparison of MAD(0,4) with MAD(2,6) to determine the position of the lower MAD value, MAD((0,4),(2,6)); and comparison of MAD(1,5) with MAD(3,7) to determine the position of the lower MAD value, MAD((1,5),(3,7)).

The two-word packed subtract unit 323 produces two carry bits (i.e., a two-bit result indicative of the position of the two lower MAD values). The two carry bits are propagated to the two-pair packed-select unit 332, which has the 64-bit result from the four-pair packed-select unit 320, and, also, to the 7×3 code converter 340. The two-pair packed-select unit 332 selects the two 16-bit results that correspond to the lower two MAD values as indicated by the two carry bits. These two 16-bit results are directed to a one-pair packed-select unit 336 as well as a one-pair packed-subtract unit 334. The one-pair packed-subtract unit 334 compares the two 16-bit results to determine which of the two 16-bit results represents the lower MAD value. In other words, the one-pair packed-subtract unit 334 compares MAD((1,5),(3,7)) and MAD((0,4),(2,6)) to determine the lowest MAD value, MAD((1,5),(3,7),(0,4),(2,6)).

In doing so, the one-pair packed-subtract unit 334 produces a single carry bit, which is indicative of the position of the lowest MAD value. This single carry bit is propagated to the one-pair packed-select unit 336, which has the 32-bit result from the two-pair packed-select unit 332, and, also, to the 7×3 code converter 340. The one-pair packed-select unit 336 selects the lowest 16-bit result, and forwards the lowest 16-bit result to the result register 350 as BEST_MAD[0:15].

At this point, the 7×3 code converter has received a total of seven carry bits (i.e., four carry bits from the four-pair packed-subtract unit 314, two carry bits from the two-pair packed-subtract unit 323, and a single carry bit from the one-pair packed-subtract unit 336). The code converter 340 produces a three-bit number from the received seven carry bits. This three-bit number is indicative of the position of the lowest MAD value. The three-bit number is also stored in the result register 350.

As shown from the system of FIGS. 3A and 3B, the sequential narrowing of four 16-bit results, to two 16-bit results, to one 16-bit result may be seen as a binary search. Thus, if $2^n$ MAD values are calculated from the processor 100 (FIG. 1), 200 (FIG. 2), then n packed-subtract units and n packed-select units would be employed in deriving the lowest MAD value. Also, a $2^n-1$ ×n code converter would be employed as compared to the specific 7×3 code converter of FIG. 3B.

Figure 4:
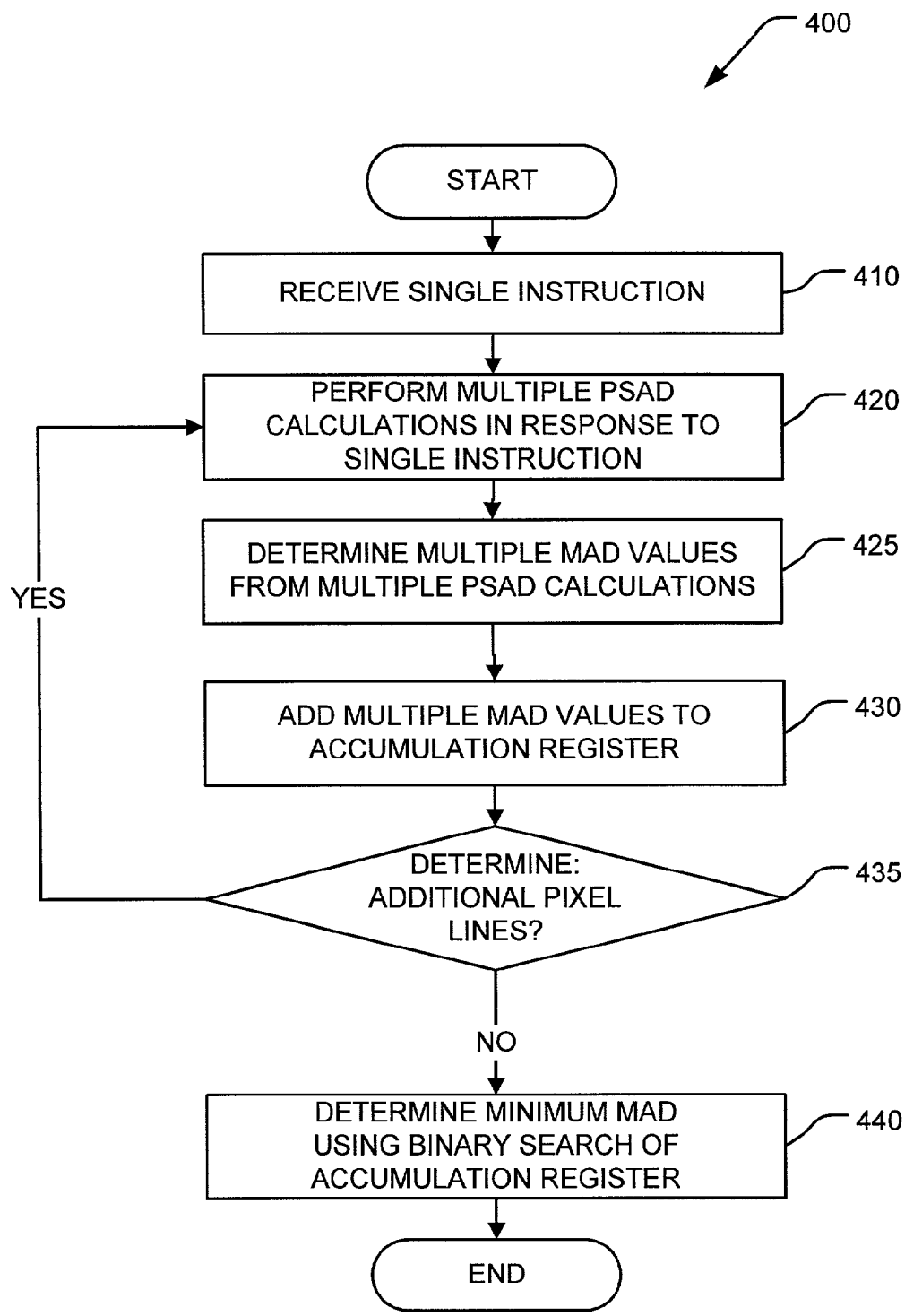
FIG. 4 is a flowchart showing method steps in one embodiment of a method for performing multiple PSAD calculations in response to a single microprocessor instruction.
Figure 5A:
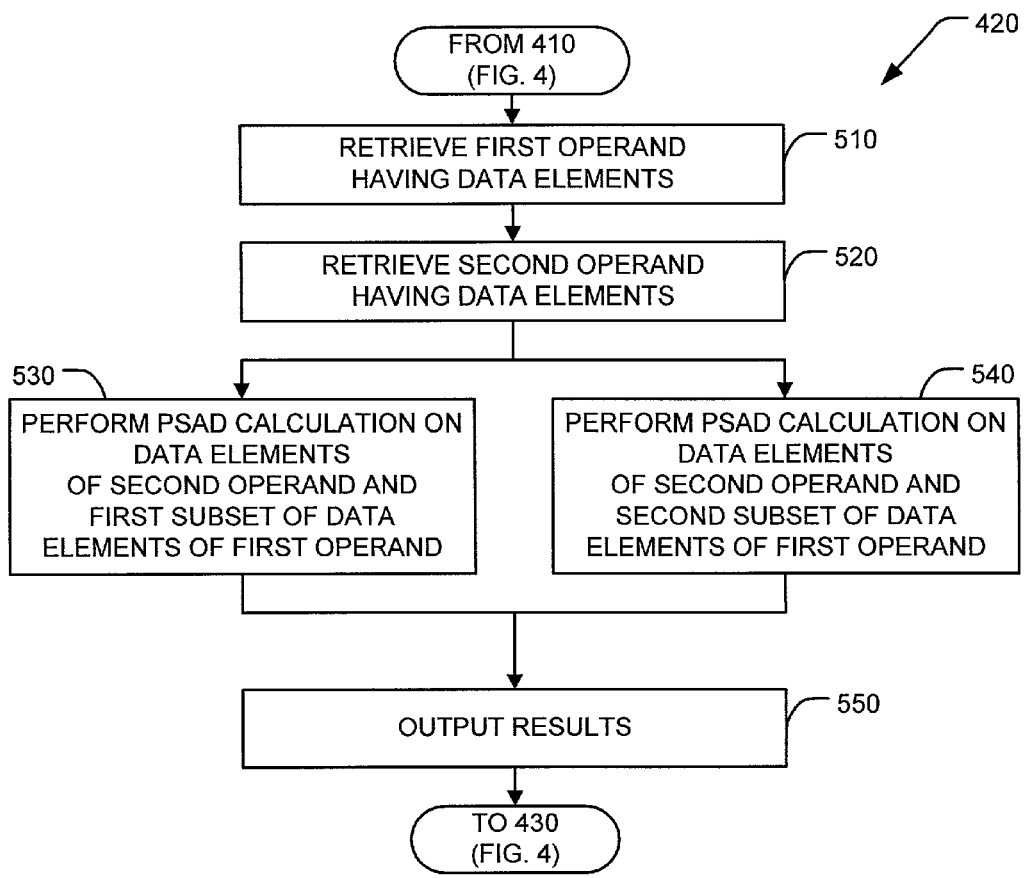
FIG. 5A is a flowchart showing, in greater detail, method steps in one embodiment of the step of performing the multiple PSAD calculation of FIG. 4.
Figure 5B:
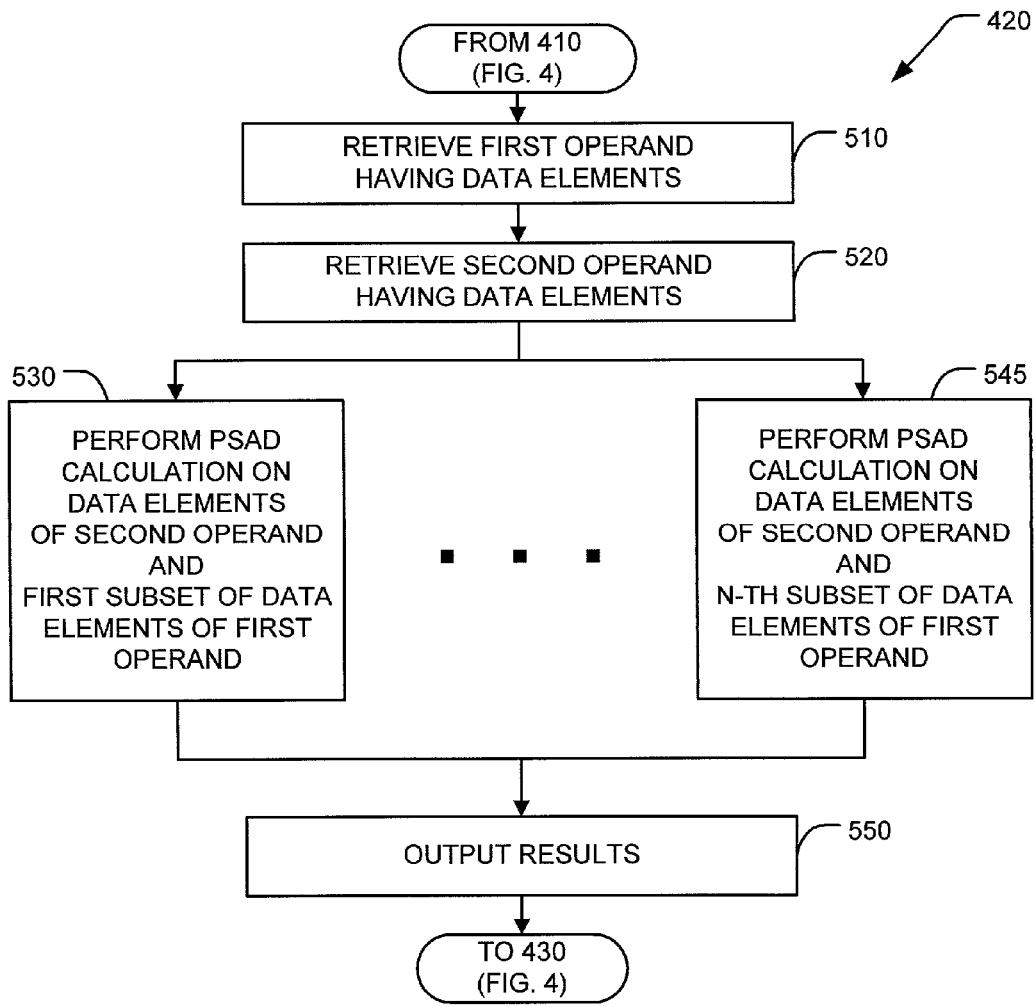
FIG. 5B is a flowchart showing, in greater detail, method steps in another embodiment of the step of performing the multiple PSAD calculation of FIG. 4.
Figure 6:
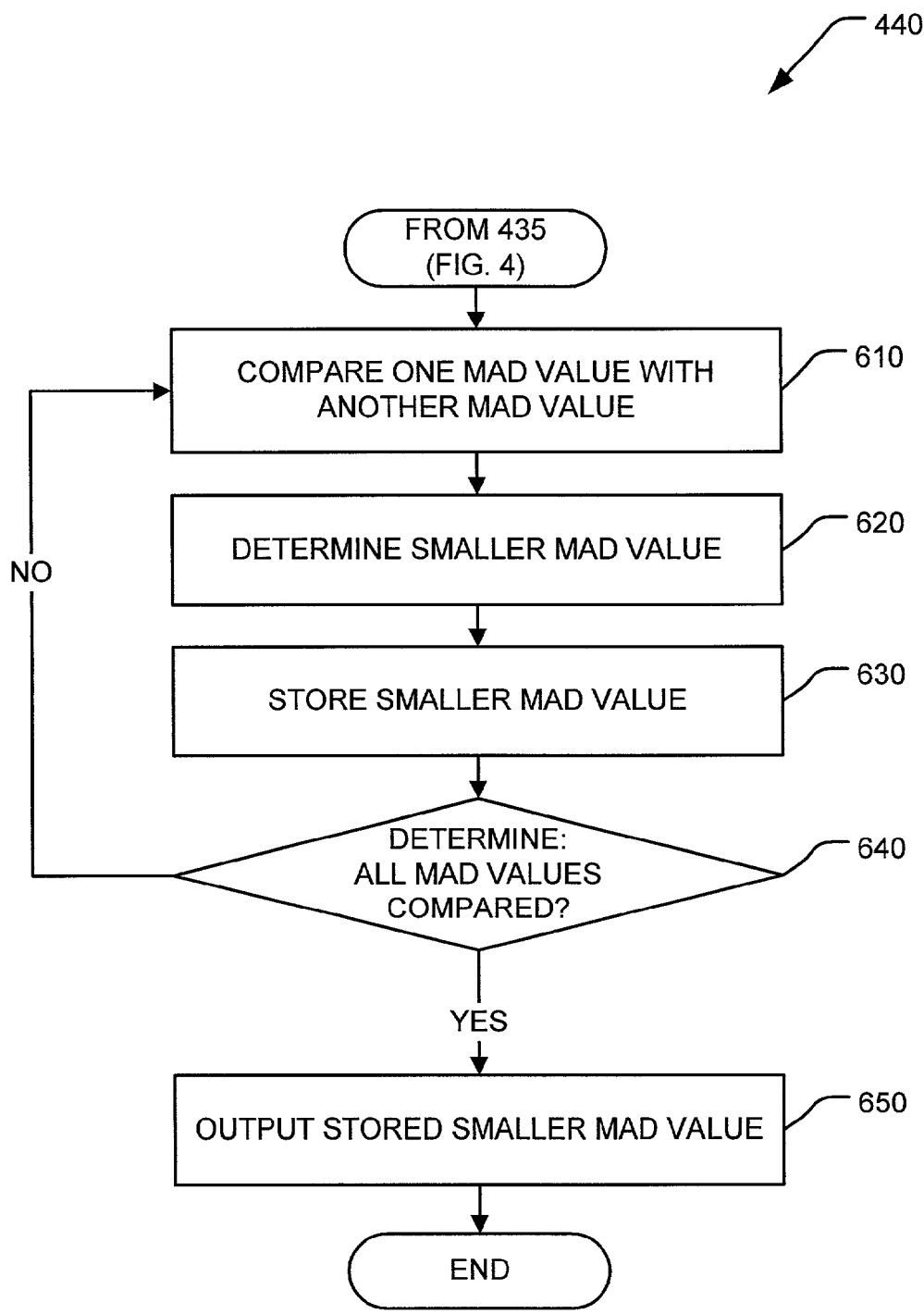
FIG. 6 is a flowchart showing, in greater detail, method steps associated with the step of determining the minimum MAD value of FIG. 4.

Having described several embodiments of systems for computing multiple PSAD and lowest MAD values, attention is turned to FIGS. 4 through 6, which show embodiments of methods for computing multiple PSAD and lowest MAD values.

FIG. 4 is a flowchart 400 showing method steps in one embodiment of a method for performing multiple PSAD calculations in response to a single microprocessor instruction. As shown in FIG. 4, one embodiment of the method begins with receiving, in step 410, a single microprocessor instruction. Once the microprocessor instruction has been received 410, multiple PSAD calculations are performed, in step 420, in response to the single microprocessor instruction. In a preferred embodiment, the processor 100 of FIG. 1 or the processor 200 of FIG. 2 may be employed to perform the multiple PSAD calculations. Once the multiple PSAD calculations have been performed 420, multiple MAD values are determined, in step 425, and added, in step 430, to an accumulation register. For multiple pixel lines, the adding step 430 may be seen as inserting MAD values for a first pixel line into the accumulation register, and then adding subsequent MAD values to the stored values in the accumulation register. Alternatively, the adding step 430 may be seen as loading an accumulation register with 0 prior to MAD calculations, and then simply adding calculated MAD values to the accumulation register. The adding step 430 is followed by a determining, in step 435, of whether or not there are additional lines (e.g., pixel lines, data lines, etc.) of a macroblock for which MAD values should be calculated. If it is determined 435 that additional lines exist for MAD calculations, then the further multiple PSAD calculations are performed 420 for those additional lines. If, on the other hand, it is determined 435 that there are no additional lines for which a MAD value should be calculated, then a minimum MAD value is determined, in step 440, using a binary search of the accumulation register. In a preferred embodiment, the system of FIGS. 3A and 3B may be employed to determine 440 the "best" MAD value.

FIG. 5A is a flowchart showing, in greater detail, method steps in one embodiment of the step of performing 420 the multiple PSAD calculation of FIG. 4. As shown in FIG. 5A, once the microprocessor instruction has been received 410 (FIG. 4), a first operand having data elements is retrieved, in step 510, and a second operand having data elements is further retrieved, in step 520. In a preferred embodiment, these operands would be OP1 110 and OP2 130 as described with reference to FIGS. 1 and 2. Once the operands have been retrieved 510, 520, a PSAD calculation is performed, in step 530, using the data elements of the second operand and a first subset of data elements of the first operand. Additionally, the a PSAD calculation is performed, in step 540, using the data elements of the second operand and a second subset of data elements of the first operand. In a preferred embodiment, the performing of the two PSAD calculations would occur substantially simultaneously as shown in FIG. 1. However, in another embodiment, the performing of the two PSAD calculations may occur sequentially as shown in the FIG. 2. Regardless of how the PSAD calculations are performed, the result of each of the calculations is output, in step 550, to a destination register. In a preferred embodiment, the destination register is DOP [0:128] as shown in FIGS. 1 and 2.

FIG. 5B is a flowchart showing, in greater detail, method steps in another embodiment of the step of performing 420 the multiple PSAD calculation of FIG. 4. Unlike FIG. 5A, which shows only two parallel PSAD calculations, the embodiment of FIG. 5B permits n parallel PSAD calculations. As described with reference to FIGS. 1 and 2, it is convenient to choose n as a power of 2. As shown in FIG. 5B, once the microprocessor instruction has been received 410 (FIG. 4), a first operand having data elements is retrieved, in step 510, and a second operand having data elements is retrieved, in step 520. In a preferred embodiment, these operands would be OP1 110 and OP2 130 as described with reference to FIGS. 1 and 2. Once the operands have been retrieved 510, 520, a PSAD calculation is performed, in step 530, using the data elements of the second operand and a first subset of data elements of the first operand. Additionally, a PSAD calculation is performed, in step 540, using the data elements of the second operand and a second subset of data elements of the first operand. Furthermore, a PSAD calculation is performed using a third subset of data elements of the first operand and so on, until all n PSAD calculations have been performed. In a preferred embodiment, n=8, thereby permitting eight independent PSAD calculations on eight different subsets of data elements of the first operand. In a preferred embodiment, the n PSAD calculations would occur substantially simultaneously as shown in FIG. 1. However, in another embodiment, the n PSAD calculations may occur sequentially as shown in the FIG. 2. Regardless of how the PSAD calculations are performed, the result of each of the calculations is output, in step 550, to a destination register. In a preferred embodiment, the destination register is DOP[0:128] as shown in FIGS. 1 and 2.

FIG. 6 is a flowchart showing, in greater detail, method steps associated with the step of determining 440 the minimum MAD of FIG. 4. As shown in FIG. 6, once the multiple MAD values have been determined 425, one of the MAD values is compared, in step 610, with another of the MAD values, and a smaller of the compared 610 MAD values is determined, in step 620, and stored, in step 630. Once the smaller MAD value has been stored 630, it is determined, in step 640, whether or not all MAD values have been compared (i.e., whether or not the smallest MAD value has been determined). If all MAD values have not been compared, then the steps repeat from step 610, in which MAD values are further compared. If, however, all MAD values have been compared, then the stored smallest MAD value is output, in step 650. In a preferred embodiment, the method steps of FIG. 6 may be executed using a system, such as the one described with reference to FIGS. 3A and 3B.

The processor 100 (FIG. 1), 200 (FIG. 2), the PSAD execution units 150 (FIGS. 1 and 2), and the pack unit 160 (FIG. 1) of the present invention can be implemented in hardware, software, firmware, or a combination thereof. In the preferred embodiment(s), the processor 100 (FIG. 1), 200 (FIG. 2), the PSAD execution units 150 (FIGS. 1 and 2), and the pack unit 160 (FIG. 1) are implemented in hardware, and, hence, may be implemented with any or a combination of the following technologies: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. However, the processor 100 (FIG. 1), 200 (FIG. 2), the PSAD execution units 150 (FIGS. 1 and 2), and the pack unit 160 (FIG. 1) may also be implemented in software or firmware, as in an alternative embodiment, which is stored in a memory and is executed by a suitable instruction execution system.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although an exemplary embodiment of the present invention has been shown and described, it will be apparent to those of ordinary skill in the art that a number of changes, modifications, or alterations to the invention as described may be made, none of which depart from the spirit of the present invention. All such changes, modifications, and alterations should therefore be seen as within the scope of the present invention.

We claim:

1. A system comprising:
a first register configured to store a first operand, wherein the first operand has data elements;
a second register configured to store a second operand, wherein the second operand has data elements; and
a processor configured to perform multiple packed-sum-absolute-difference (PSAD) calculations in response to a single instruction, wherein each of the multiple PSAD calculations is performed between the data elements of the second operand and different subsets of data elements of the first operand.

2. The system of claim 1, wherein the first register is further configured to store a first operand having a number of data elements greater than the number of data elements of the second operand.

3. The system of claim 2, wherein the number of data elements in each of the different subsets is equal to the number of data elements in the second operand.

4. The system of claim 3, wherein each of the different subsets has overlapping elements with at least one other of the different subsets.

5. The system of claim 3, wherein the elements of each of the different subsets occupy a contiguous portion of the first register.

6. The system of claim 1, wherein the processor is configured to perform multiple PSAD calculations in parallel.

7. The system of claim 1, wherein the first register is further configured to store a 128-bit first operand, wherein the second register is further configured to store a 64-bit second operand.

8. The system of claim 1, further comprising a destination register configured to store a result of each of the multiple PSAD calculations.

9. A system comprising:
a first register configured to store a first operand, wherein the first operand has data elements;
a second register configured to store a second operand, wherein the second operand has data elements; and
a processor configured to perform multiple packed-sum-absolute-difference (PSAD) calculations in response to a single instruction, wherein at least one of the multiple PSAD calculations is performed on the data elements of the second operand and a first subset of data elements of the first operand.

10. The system of claim 9, wherein the processor is further configured to perform multiple PSAD calculations on pixels of a video frame represented by the first operand.

11. The system of claim 10, wherein the processor is further configured to perform multiple PSAD calculations on pixels of a video frame represented by the second operand.

12. The system of claim 9, wherein the processor is further configured to perform multiple PSAD calculations on pixels of a reference image represented by the first operand.

13. The system of claim 12, wherein the processor is further configured to perform multiple PSAD calculations on pixels of an object image represented by the second operand.

14. The system of claim 9, wherein the first register is further configured to store a first operand having a greater number of data elements than the number of data elements of the second operand.

15. The system of claim 14, wherein the number of data elements in the first subset of data elements is equal to the number of data elements in the second operand.

16. The system of claim 14, wherein the processor is configured to perform another of the multiple PSAD calculations on the data elements of the second operand and a second subset of data elements of the first operand.

17. The system of claim 16, wherein elements of the first subset overlap with elements of the second subset.

18. The system of claim 16, wherein the first register is further configured to store elements of the first subset in a first contiguous portion.

19. The system of claim 16, wherein the first register is further configured to store a first contiguous portion having a sequential group of bytes.

20. The system of claim 18, wherein the first register is further configured to store elements of the second subset in a second contiguous portion of the first register.

21. The system of claim 9, wherein the processor is configured to perform the multiple PSAD calculations substantially in parallel.

22. The system of claim 9, wherein the processor is configured to perform the multiple PSAD calculations substantially sequentially.

23. The system of claim 9, wherein the first register is a $2^n$ bit register, wherein n is an integer value.

24. The system of claim 23, wherein the second register is a $2^m$-bit register, wherein m is an integer value.

25. The system of claim 9, wherein the first register is a 128-bit register and the second register is a 64-bit register.

26. The system of claim 9, further comprising a destination register configured to store a result of each of the multiple PSAD calculations.

27. The system of claim 26, wherein the processor is configured to store each of the results of each of the multiple PSAD calculations in non-overlapping contiguous portions of the destination register.

28. The system of claim 27, wherein the processor is further configured to generate 16-bit results as a result of each of the multiple PSAD calculations.

29. The system of claim 28, wherein the processor is further configured to determine multiple mean absolute difference (MAD) values from the multiple PSAD calculations.

30. The system of claim 29, wherein the processor is further configured to determine a minimum MAD value from the multiple MAD values.

31. The system of claim 30, wherein the processor is further configured to perform a binary search on the results of the multiple MAD calculations.

32. The system of claim 9, wherein the processor is configured to recursively perform the multiple PSAD calculations in response to a single instruction.

33. The system of claim 32, wherein the processor is further configured to receive a single instruction comprising:
a starting address; and
a number of iterations.

34. A system comprising:
a first register configured to store a first operand, wherein the first operand has data elements;
a second register configured to store a second operand, wherein the second operand has data elements;
a processor configured to receive a single instruction and issue a command; and
dedicated hardware configured to receive the issued command from the processor, wherein the hardware is configured to perform multiple packed-sum-absolute-difference (PSAD) calculations in response to the issued command, wherein at least one of the multiple PSAD calculations is performed between the data elements of the second operand and a first subset of data elements of the first operand.

35. A system comprising
means for receiving a single instruction; and
means for performing multiple packed-sum-absolute-difference (PSAD) calculations in response to the single instruction.

36. The system of claim 35, wherein the means for performing multiple PSAD calculations comprises:
means for retrieving a first operand having data elements in response to the receiving of the single instruction; and
means for retrieving a second operand having data elements in response to the receiving of the single instruction.

37. The system of claim 36, wherein the means for performing multiple PSAD calculations further comprises means for performing a PSAD calculation using the data elements of the second operand and a first subset of data elements of the first operand.

38. The system of claim 37, wherein the means for performing multiple PSAD calculations further comprises means for performing a PSAD calculation using the data elements of the second operand and a different subset of data elements of the first operand.

39. The system of claim 36, wherein the means for performing multiple PSAD calculations further comprises means for outputting a result in response to the performing of the multiple PSAD calculations.

40. The system of claim 35, further comprising means for determining multiple mean absolute difference (MAD) values from the multiple PSAD calculations.

41. The system of claim 40, further comprising means for determining a minimum calculated MAD value from the multiple MAD values.

42. The system of claim 41, wherein the means for determining a minimum calculated MAD value comprises means for performing a binary search on the multiple MAD values.

43. The system of claim 42, wherein the means for performing a binary search comprises:
means for comparing one of the multiple MAD values with another of the multiple MAD values;
means for evaluating which of the two MAD values is smaller; and
means for outputting the smaller of the two MAD values.

44. The system of claim 35, further comprising means for recursively performing multiple PSAD calculations in response to the single instruction.

45. The system of claim 44, wherein the means for performing the multiple PSAD calculations comprises means for receiving a single instruction having:
a starting address; and
a number of iterations.

* * * * *